United States Patent [19]
Ashley et al.

[11] Patent Number: 5,651,925
[45] Date of Patent: Jul. 29, 1997

[54] PROCESS FOR QUENCHING MOLTEN CERAMIC MATERIAL

[75] Inventors: Peter J. Ashley, Madison, Ala.; Larry Hill, Niagara Falls, Canada; Christopher E. Knapp, Grimsby, Canada; Rene G. Demers, Niagara Falls, Canada; D. C. Batchelor, Lacey's Spring, Ala.

[73] Assignee: Saint-Gobain/Norton Industrial Ceramics Corporation, Worcester, Mass.

[21] Appl. No.: 565,505

[22] Filed: Nov. 29, 1995

[51] Int. Cl.⁶ .................................................. B29B 9/00
[52] U.S. Cl. .................................. 264/12; 264/5; 264/14
[58] Field of Search ........................... 264/5, 12, 14

[56] References Cited

U.S. PATENT DOCUMENTS

| | | | |
|---|---|---|---|
| 3,726,621 | 4/1973 | Cichy | 425/6 |
| 3,928,515 | 12/1975 | Richmond et al. | 264/5 |
| 4,042,653 | 8/1977 | Beyn | 264/12 |
| 4,177,026 | 12/1979 | Honnorat et al. | 264/12 |
| 4,233,007 | 11/1980 | Karlsson | 264/12 |
| 4,359,434 | 11/1982 | Tiberg | 264/12 |
| 4,810,284 | 3/1989 | Auran et al. | 264/12 |
| 4,838,912 | 6/1989 | Amlinger | 264/12 |
| 4,917,852 | 4/1990 | Poole et al. | 264/500 |
| 4,937,225 | 6/1990 | Kalonji et al. | 264/12 |
| 4,952,144 | 8/1990 | Hansz et al. | 264/5 |

OTHER PUBLICATIONS

Richard Lewis, "Hawley's Condensed Chemical Dictionary", 12th Ed., p. 528 1993.

*Primary Examiner*—Donald E. Czaja
*Assistant Examiner*—Michael P. Colaianni
*Attorney, Agent, or Firm*—David Bennett

[57] ABSTRACT

A process is provided that permits the rapid quenching of molten ceramics by passing a flow of the molten ceramic into a turbulent fluid flow such that the flow is broken up into particles which then solidify as they pass into and through a cyclone and are finally separated from the fluid flow and collected as dry particulate ceramic materials.

6 Claims, 1 Drawing Sheet

PROCESS FOR QUENCHING MOLTEN CERAMIC MATERIAL

BACKGROUND TO THE INVENTION

This invention relates to fused materials produced in a finely divided form. It relates specifically to a method making such finely divided materials particularly where these are ceramic in nature.

It is well known in the art that a material produced in a molten state is most preferably reduced to a more manageable temperature by a rapid quenching operation. This may be done by pouring the melt into water but this generates very large quantities of steam and requires a very large excess of water. In addition the water can be the source of impurities or undesirable reactions. To counter this problem it has been proposed to drop the fused material on to cooling media such as steel balls or into cavities between thick steel plates. For material dropped on to steel balls there is the continuing problem of separation of product from the cooling media. When material is dropped between steel plates, the plates deteriorate and need to be replaced at frequent intervals. Air or water quenching solves both these problems but does have the limitation of not providing crude material that can be crushed and sized to provide abrasive grit sizes of the full range required by the abrasives industry.

For ceramic and refractory materials however the preferred method is to air quench the molten materials. In this process the molten stream is injected into a high speed stream of cold air. The turbulence divides the stream into droplets which are then chilled by the air such that initially a shell forms around the droplet with the thickness increasing until all the droplet has solidified. This process too is not without its problems however since it is estimated that a droplet/particle needs to travel as much as 15 feet before the shell is strong enough to withstand inter-particle contacts that could rupture the shell and cause fusion between colliding droplet/particles. In addition the process generates a lot of dust that poses a collection and pollution problem.

A novel method has now been devised in which a molten ceramic material can be rapidly solidified with minimum generation of dust to obtain relatively uniform spherical particles. This method can be adapted to the production of a wide variety of ceramics including zirconia, yttria-stabilized zirconia, alumina, alumina/zirconia, magnesia and the like.

GENERAL DESCRIPTION OF THE INVENTION

The present invention provides a process for quenching a molten ceramic material which comprises feeding a stream of a molten ceramic into a turbulent fluid stream at such a temperature and flow rate that the melt flow is broken up into a flow of droplets which become entrained in the fluid flow and cool. The cooled droplets are then separated from the fluid. This separation is conveniently carried out in a cyclone separator.

In a preferred process the fluid flow comprises water droplets or water droplets entrained in air though it is also possible to use a fluid flow comprising only air. The presence of water is however very desirable since the water droplets aid significantly in the efficient cooling of the molten ceramic droplets. It is also foreseen that other gases could be substituted for air, such as nitrogen and carbon dioxide. However the obvious advantages of air in terms of cost and availability usually make it the preferred choice.

In a preferred embodiment of the invention air or an air/water mixture is injected through a arcuate slit with the concave side of the arc facing upwards. The speed of the fluid flow is such that the molten material being entrained is not able to penetrate the fluid flow which forms a sort of channel in which the material is carried along.

The cyclone separator comprises a vertically oriented, funnel shaped vessel with a tangential in-flow port located at the upper part of the funnel and an exit port at the lower end of the funnel. The flow is introduced through the in-flow port such that it flows around and down the inside wall of the separator in a spiral fashion before exiting through the exit port. In the process air and steam, (generated during cooling of the molten ceramic where the flow comprises water), are allowed to escape through the upper end of the cyclone. The solidified droplets and, where water is included in the fluid flow, any non-vaporized water exit at the bottom of the cyclone and are separated. The particles are then dried.

It is often desirable to provide the inside of the cyclone with baffles to break up swirl patterns of flow which can set up vibrational effects that could over time impair the structural integrity of the system.

The top of the cyclone can be provided with a venting system but more often, providing the length above the injection port is great enough, the top may be left open without serious problems.

Because of the heat transfer that occurs in the cyclone, it is often desirable to provide that at least a portion of the cyclone is provided with a cooling jacket to absorb the heat recovered. In the event water is used in the injection phase of the process, the products is obtained wet and requires a drying operation before it can be bagged and transported. In these circumstances however it may be possible to allow the recovered particles to retain enough heat to dry without the need for a separate drying stage. In such event drying can be accomplished by merely physically draining the water away and allowing the particles to air-dry as a thin layer on a conveyor-transporter.

The present invention is particularly well adapted to the manufacture of fused materials that are required in as fine a crystalline form as possible. The invention has specific utility in connection with the production of zirconia refractory materials where rapid quenching in an oxidizing environment reduces the amount of nitride and carbide compounds in the final product. Fully oxidized products are considered to be advantageous in the refractory industry. It could also be applied to the quenching of alumina/zirconia abrasive materials where the rapid solidification tends to stabilize the tetragonal form of zirconia, which is considered to have a beneficial effect on abrasive properties. In addition, by controlling the turbulence of the flow it is possible to obtain particles of different size distributions that can be used directly or with further crushing or sizing as abrasive materials.

DRAWINGS

DESCRIPTION OF PREFERRED EMBODIMENTS

The invention is now described with particular reference to the equipment described in the attached Drawings.

Figure 1:
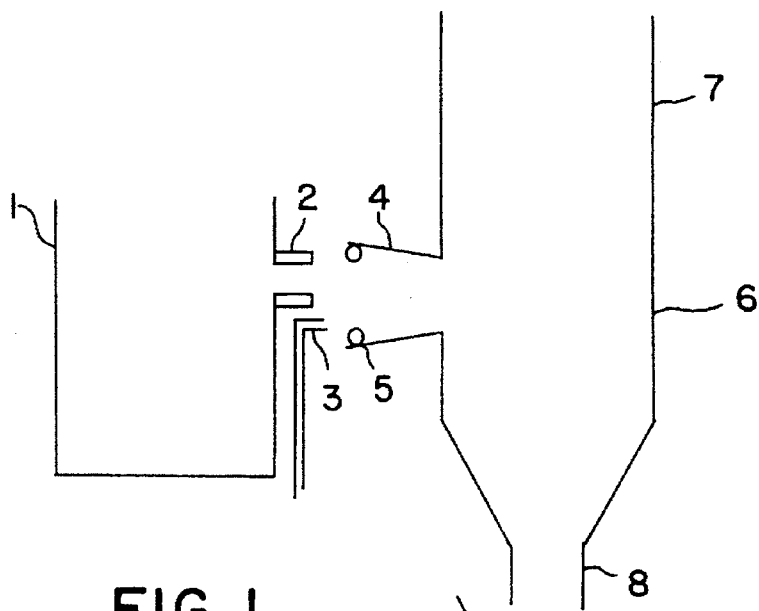
FIG. 1 represents a vertical diagrammatic cross-section of an apparatus according to the invention.
Figure 2:
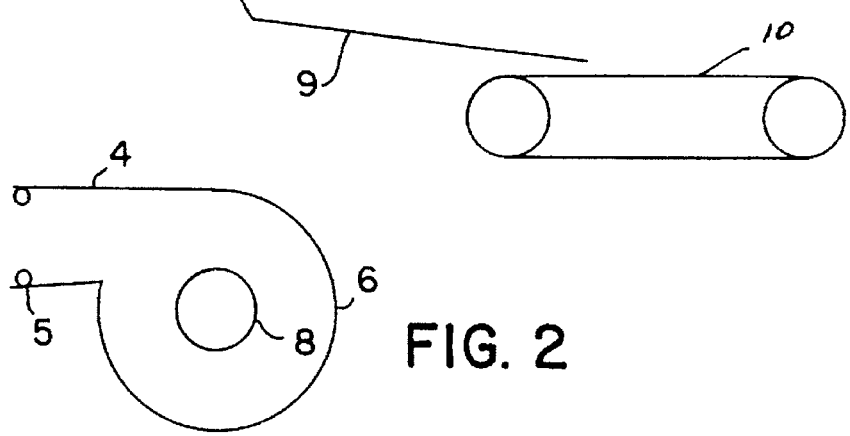
FIG. 2 represents a view from above the cyclone portion of the apparatus shown in FIG. 1.

In FIG. 1 a furnace, 1, is used to produce a molten ceramic material. From the furnace the molten material passes through a spout, 2, to the entrance, 4, of a cyclone, 6. The molten flow is entrained in a flow of air, water or air/water passing through entraining jet, 3. Extra cooling water may be added through an annular ring-jet 5, at the mouth of the entrance, 4, to the cyclone, 6. The entraining jet operates at high pressure creating a turbulent zone between the spout and the mouth of the entrance to the cyclone that effectively breaks up the molten stream into fine droplets that are solidified and cooled as they enter the cyclone. An extension, 7, above the point at which the material enters the cyclone prevents escape of particles from the cyclone while in operation.

The cyclone may be provided with baffles, (not shown), to ensure more uniform cooling and to reduce possible vibrations. When the flow exits the cyclone it is deposited in a separator device, 9, designed to collect the solid particles and from the separator the ceramic material is deposited on a conveyor-collector, 10.

Figure 3:
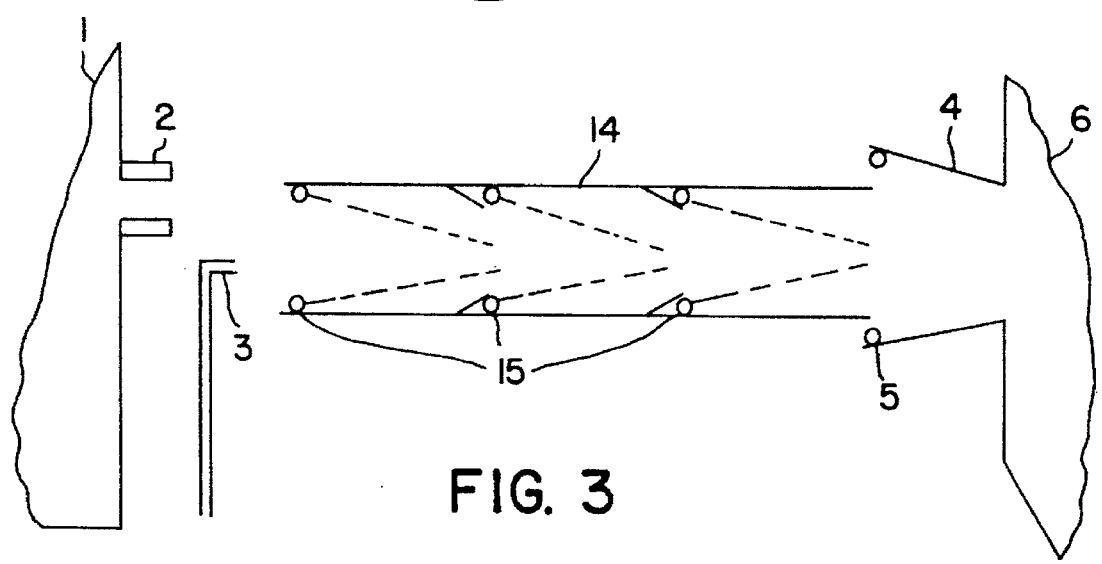
FIG. 3 represents an alternative embodiment of the invention using a water cannon.

It is also possible and often advantageous to place a further cooling system ahead of the cyclone such that all molten product is solidified prior to entry into the cyclone which then acts to further cool and finally separate any water from the ceramic product. One example of such a further cooling system is a "water cannon" and an example of a device incorporating such a device is illustrated in FIG. 3. Molten product is poured from a furnace, 1, through a spout, 2, and into a fluid stream from an atomizing nozzle, 3, directed down the length of the water cannon tube, 14, provided with a plurality of water cannon rings, 15, with the jets thereof directed into the cannon and angled along its length. Each ring is baffled ahead of the ring to prevent build-up of product against the rings which can lead to steam explosions. The exit of the water cannon is placed at the entry to the cyclone.

The advantage of this system is that larger quantities of cooling water can be used if needed. Further by designing the water cannon with many cooling rings each with a shut-off, the amount of water used can be carefully controlled. The water cannon can be separate from the cyclone or attached to it.

The apparatus can be operated such that fluid flow is provided entirely by water, entirely by air or by a mixture of the two. In one particularly preferred embodiment an air/water mixture was supplied with the air at 90 psi and water addition at about 40 psi through a half open one inch pipe. The product, which was yttria stabilized zirconia, (up to about 5% by weight of yttria), obtained with this arrangement had nothing finer than 100 mesh and was largely made up of quarter inch coarse granules.

In general water atomization, (no air), produced large particles with few smaller than 40 mesh screen. The use of air alone produced a much finer distribution and a combination of water and air produced intermediate particle size distributions. In general however the higher the velocity of the atomising fluid flow passing through the jet, 3, the better the atomization and the smaller the particles obtained. As might be expected, the flow of the molten ceramic also affected the coarseness of the particles with higher flow rates being associated with coarser product at any given fluid flow rate.

The effectiveness of the apparatus was evaluated using a spinel material comprising 5% of MgO with 95% of alumina. Water at 100 psi was injected through the jet and a screen of water was created by passing water at 45 psi through the ring jet. This produced a coarse product with less than about 3% by weight passing through a 40 mesh screen.

When air was fed at 80 psi through the entraining jet and through the same water screen, the product was obtained in a much finer particle size.

Using a ceramic comprising 10% alumina, 5% silica, and 85% of zirconia and spraying water through the ring jet and air alone through the entraining jet, 99.78% by weight of the product was retained on a 70 mesh screen and 90.6% by weight was retained on a 30 mesh screen. Only 42.28% by weight was coarser than a 12 mesh screen.

Using the same ceramic feed stock but with the water ring jet switched off and an air/water mix supplied through the entraining jet a similar pattern was observed with 99.79% by weight being retained on a 70 mesh screen and about 40.47% being coarser than 12 mesh.

Using only air in the entraining jet and no water ring, the particle size distribution was somewhat finer with only 91.2% by weight being retained on a 70 mesh screen, 59.75% on a 30 mesh screen and only 19.17% by weight being coarser than a 12 mesh screen.

What is claimed is:

1. A process for quenching a molten ceramic material which comprises feeding a stream of a molten ceramic into a turbulent stream consisting of at least one fluid such that the molten ceramic stream is broken up into a flow of droplets which are entrained in the fluid stream and become solid particles which are conveyed into a cyclone in a flow that is tangential to the side of the cyclone.

2. A process according to claim 1 in which the ceramic material is selected from the group consisting of magnesia, alumina, zirconia, alumina/zirconia mixtures, and alumina or zirconia modified with minor proportions of yttria, silica, magnesia and mixtures thereof.

3. A process according to claim 1 in which the turbulent fluid stream is selected from the group consisting of air, water and mixtures of air and water.

4. A process according to claim 1 in which the turbulent fluid stream entrains the molten ceramic through a water screen.

5. A process according to claim 1 in which the turbulent fluid stream is injected into the mouth of a water cannon.

6. A process according to claim 1 in which the temperature of the cyclone is controlled such that the particles retain sufficient heat upon exiting the cyclone that a separate application of heat to render the particles essentially dry is unneccesary.

* * * * *

UNITED STATES PATENT AND TRADEMARK OFFICE
CERTIFICATE OF CORRECTION

PATENT NO. : 5,651,925

DATED : July 29, 1997

INVENTOR(S) : Ashley et al.

It is certified that error appears in the above-indentified patent and that said Letters Patent is hereby corrected as shown below:

Claim 1, Column 4, line 38

Delete "solid" and insert --- solidified

Signed and Sealed this

Twenty-first Day of October 1997

Attest:

BRUCE LEHMAN

Attesting Officer     Commissioner of Patents and Trademarks